United States Patent
Will et al.

(10) Patent No.: US 8,053,701 B2
(45) Date of Patent: Nov. 8, 2011

(54) INERT GAS COVER SYSTEM FOR LASER WELDING

(75) Inventors: Jeff Dean Will, Maple Valley, WA (US);
David Scott Nansen, Renton, WA (US);
David M. Dembeck, Puyallup, WA (US)

(73) Assignee: The Boeing Company, Chicago, IL (US)

( * ) Notice: Subject to any disclaimer, the term of this patent is extended or adjusted under 35 U.S.C. 154(b) by 478 days.

(21) Appl. No.: 12/259,593

(22) Filed: Oct. 28, 2008

(65) Prior Publication Data
US 2010/0102041 A1 Apr. 29, 2010

(51) Int. Cl.
*B23K 26/00* (2006.01)
(52) U.S. Cl. ......... 219/121.63; 219/121.64; 219/121.84; 219/121.86
(58) Field of Classification Search ............. 219/121.64, 219/121.86, 121.63, 121.84
See application file for complete search history.

(56) References Cited

U.S. PATENT DOCUMENTS

| | | | |
|---|---|---|---|
| 4,217,397 A | | 8/1980 | Hayase et al. |
| 4,503,314 A | | 3/1985 | Kakimi et al. |
| 5,359,176 A | * | 10/1994 | Balliet et al. ............. 219/121.84 |
| 5,977,515 A | * | 11/1999 | Uraki et al. ............. 219/121.84 |
| 5,981,901 A | * | 11/1999 | La Rocca ................. 219/121.63 |
| 6,040,550 A | | 3/2000 | Chang |
| 6,204,475 B1 | * | 3/2001 | Nakata et al. ............. 219/121.84 |
| 6,281,472 B1 | | 8/2001 | Faerber |
| 6,326,585 B1 | * | 12/2001 | Aleshin et al. ........... 219/121.63 |
| 6,507,000 B2 | * | 1/2003 | Otsubo et al. ............. 219/121.7 |
| 6,555,779 B1 | * | 4/2003 | Obana et al. ............. 219/121.63 |
| 7,399,941 B2 | * | 7/2008 | Causte et al. ................... 219/75 |
| 7,456,370 B2 | * | 11/2008 | Beeson et al. ........... 219/121.63 |
| 7,626,763 B2 | * | 12/2009 | Harrison et al. ............. 359/477 |
| 2006/0081562 A1 | | 4/2006 | Causte et al. |

FOREIGN PATENT DOCUMENTS

| | | |
|---|---|---|
| EP | 1607167 A1 | 12/2005 |
| EP | 1669159 A1 | 6/2006 |
| JP | 54054932 A | 5/1979 |

OTHER PUBLICATIONS

Strawn, "Industrial Use of Laser Welding", 2006, Department of Mechanical Engineering, Colorado State University, pp. 1-8.
Rotzer, "Laser-beam welding makes aircraft lighter", Frauhofer magazine, Jan. 2005, pp. 36-37.
PCT International Search Report for application PCT/US2009/062434 dated Feb. 10, 2010.

* cited by examiner

*Primary Examiner* — M. Alexandra Elve
(74) *Attorney, Agent, or Firm* — Yee & Associates, P.C.

(57) ABSTRACT

An apparatus for comprises a base, a wall, and an opening in the wall. The base has a first end, a second end, and a channel system. The channel system is located closer to the first end than the second end of the base. The wall extends from a side of the base to partially enclose the channel system. The opening in the wall is located closer to the second end than the first end. The shape of the wall is capable of retaining a gas introduced through the channel system in a welding location and causing the gas to move away from the channel system and through the opening in the wall.

17 Claims, 9 Drawing Sheets

INERT GAS COVER SYSTEM FOR LASER WELDING

BACKGROUND INFORMATION

1. Field

The present disclosure relates generally to manufacturing and, in particular, to a method and apparatus for laser welding.

2. Background

Laser welding is a technique that may be used to join multiple pieces of metal through the use of a laser. A laser beam may provide a concentrated heat source to weld different metallic parts to each other. Laser welding may be performed using various types of lasers including solid state and gas lasers. The use of a laser allows for narrow and/or deep welds. Further, the use of a laser also may provide for high welding rates. Laser welding is typically used in high-volume applications such as in the aircraft and/or automotive industry.

Laser welding may be used to weld metal components such as those comprised of carbon steel, stainless steel, aluminum, and titanium. One advantage of laser welding may be the capability to join metal components such as scrap pieces of metal for the purpose of "scrap reduction" and formation of parts rather than machining these parts from larger pieces of raw materials.

The use of laser welding for manufacturing aircraft parts and aircraft may be useful in reducing the weight of aircraft. Laser welding may be used in place of riveting when joining large metal fuselage parts to each other. These parts include, for example, stringers used in metal fuselages. Using laser welding provides an advantage over rivets, because laser welding results in less weight when manufacturing aircraft.

For example, in addition to eliminating the use of rivets, the use of a filler metal between rivet parts also may be eliminated. As a result, the structure of an aircraft may be reduced by around five percent using laser welding instead of rivets. Further, a welded joint formed using laser welding may provide greater compressive and shared strength even though this type of joint is lighter. In addition, laser welding also may have a lower cost than the use of rivets. A further advantage of using laser welding to join parts to each other is that laser welded parts are less susceptible to corrosion.

Typically, the speed of welding is proportional to the amount of power supplied to the laser as well as the type and thickness of the parts being welded. Further, the speed at which laser welding may occur also may be limited by a number of different factors. For example, when welding titanium, it is desirable to prevent air from contacting molten titanium.

Unwanted gases in the air may attack the metal and cause contamination in the molten titanium during a welding process. This type of contamination may occur if the hot metal is not kept away from air until the titanium is cool enough. This type of discoloration is undesirable for aesthetic purposes.

Further, the contamination may be identified by discoloration, which may indicate a presence of adverse effects to metal properties in the titanium. Contamination of the titanium with air during welding can cause significant reduction in ductility and fracture toughness. This condition may lead to premature cracks and early fatigue failures.

One manner in which air may be prevented from contacting the molten titanium is to perform the laser welding in a vacuum. Although this type of process may be suitable for preventing discoloration, vacuum environments may be impractical based on the size of the part. Another technique involves introducing an inert gas to prevent air from contacting the titanium until the titanium is cool enough. This type of process, however, may slow down the speed at which welding can occur for titanium.

Therefore, it would be advantageous to have a method and apparatus that overcomes the problems described above.

SUMMARY

In one advantageous embodiment, an apparatus comprises a base, a wall, and an opening in the wall. The base has a first end, a second end, and a channel system. The channel system is located closer to the first end than the second end of the base. The wall extends from a side of the base to partially enclose the channel system. The opening in the wall is located closer to the second end than the first end. The shape of the wall is capable of retaining a gas introduced through the channel system in a welding location and causing the gas to move away from the channel system and through the opening in the wall.

In another advantageous embodiment, a cover for laser welding comprises a base, a wall, an opening in the wall, and a seal attached to the wall. The base has a first side, a second side, and a channel extending from the first side to the second side. The channel is capable of receiving a laser beam and an inert gas. The wall extends from the first side of the base, with the wall enclosing an area having an elongate shape. The elongate shape has a largest area around the channel and tapers away from the channel. The wall partially surrounds the channel and has a tapered end. The opening in the wall is located around the tapered end of the wall. The elongate shape is capable of causing the inert gas to move from the channel to the opening. The seal attached to the wall is capable of conforming to a surface of a structure.

In yet another advantageous embodiment, a method is present for laser welding. A cover is positioned over a structure. The cover has a base with a first end, a second end, and a channel, in which the channel is located closer to the first end than the second end of the base. The cover also has a wall extending from a side of the base to partially enclose the channel. The cover further has an opening in the wall that is located closer to the second end than the first end. An inert gas is supplied through the channel. The shape of the wall retains a portion of the inert gas introduced through the channel in a welding location and causes a flow of the inert gas to move away from the channel and through the opening in the wall. A laser beam is sent through the channel onto a surface of the structure at the welding location. The laser beam is moved with the cover over the structure to weld the structure.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
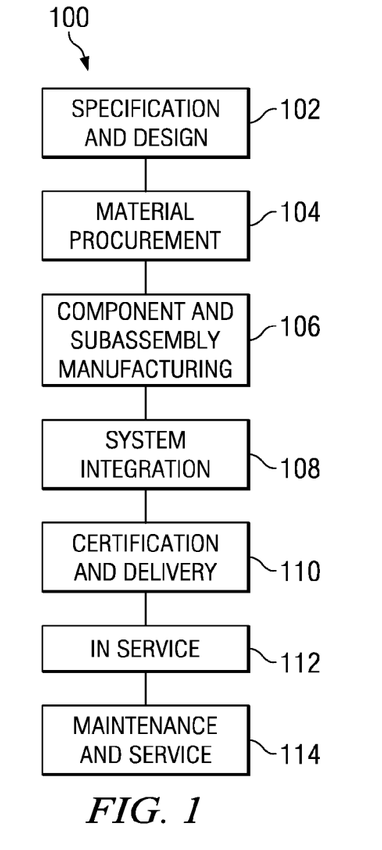
FIG. 1 is a diagram illustrating an aircraft manufacturing and service method in accordance with an advantageous embodiment.
Figure 2:
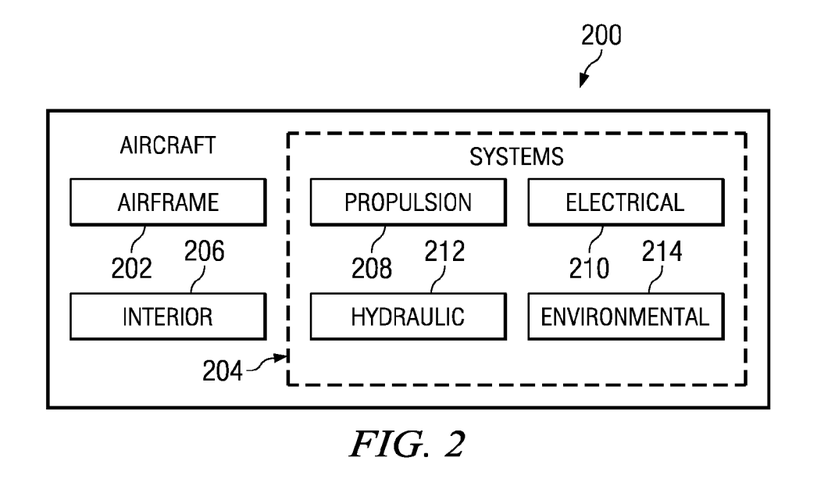
FIG. 2 is a diagram of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1. As one example, the different advantageous embodiments may be used to perform laser welding during at least one of component and subassembly manufacturing 106 and maintenance and service 114.

The different advantageous embodiments provide an apparatus that is capable of controlling the flow of gas and/or maintaining a gas environment adjacent to molten metal in a manner that reduces and/or prevents contamination during a welding process. The different advantageous embodiments provide a containment system for an inert gas to maintain the inert gas around the molten metal in a manner that seals the hot metal from contamination. Further, gas may be channeled and vented away from the molten metal. The shape of the containment system is such that the gas introduced into the air moves away from the area in which molten metal is present. This movement of gas may reduce soot or other contaminants that may be generated during the welding process.

In one advantageous embodiment, an apparatus has a base having a first end, a second end, and a channel system. The channel system is located closer to the first end than the second end of the base. A wall extends from the base to partially enclose the channel system. An opening is present in the wall that is located closer to the second end than the first end. A shape of the wall is capable of causing a gas introduced through the channel system to move away from the channel system and through the opening in the wall. In these examples, soot may be any type of particulate, gas, or other matter generated when applying a laser beam to a structure.

This type of movement of the gas is capable of moving soot away from the location at which the welding is occurring on a structure. More particularly, the gas may move away from the channel system towards the opening in the wall and carry soot that may be generated during welding away from the welding location and/or locations of heated metal. By moving soot away from these locations, contaminants may be moved away from molten metal.

Further, the shape of the wall is capable of containing or sealing gas to prevent air from contacting the metal that has been heated and/or welded until the metal has sufficiently cooled in a manner that reduces and/or prevents contamination resulting from contact to air. The movement of the soot away from the molten metal and source of the laser beam also prevents the soot from blocking the laser light from reaching the metal.

Figure 3:
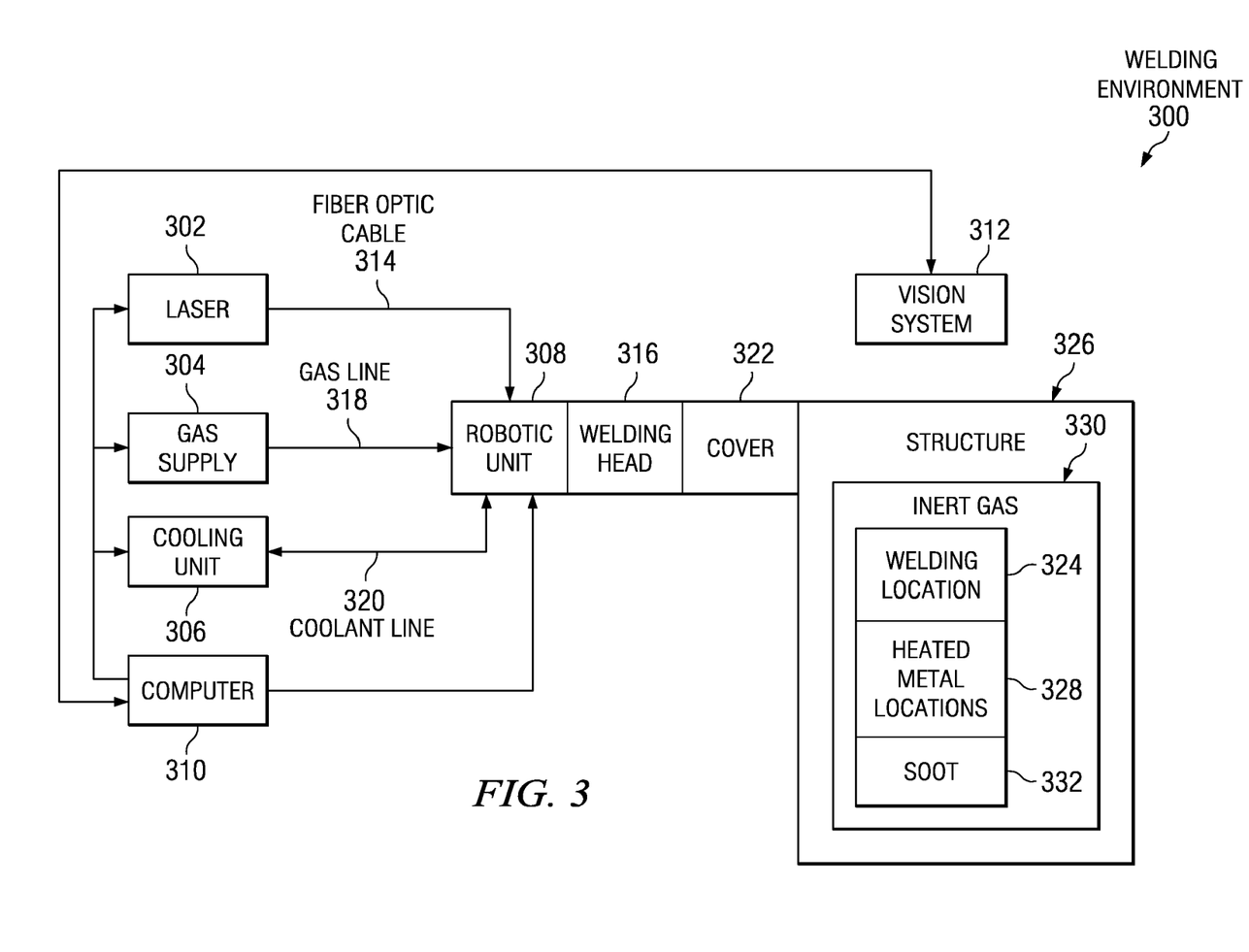
FIG. 3 is a diagram of a welding environment in accordance with an advantageous embodiment.

With reference now to FIG. 3, a diagram of a welding environment is depicted in accordance with an advantageous embodiment. Welding environment 300 in this example is a laser welding environment. Welding environment 300 includes laser 302, gas supply 304, cooling unit 306, robotic unit 308, computer 310, and vision system 312.

Laser 302 may take various forms. For example, without limitation, laser 302 may be a solid state laser and/or a gas laser. Solid state lasers may include, for example, a neodymium laser or some other suitable type of solid state laser. A gas laser may be, for example, a carbon dioxide laser, a nitrogen laser, a helium laser, or some other suitable type of gas laser. Laser energy may be supplied to robotic unit 308 through fiber optic cable 314. A laser beam may be emitted from fiber optic cable 314 through welding head 316 on robotic unit 308.

Robotic unit 308 may take various forms. For example, without limitation, robotic unit 308 may be a servo controlled, multi-access mechanical arm with welding head 316 being attached to the mechanical arm. Of course, in other advantageous embodiments, other types of mechanical structures may be used for robotic unit 308.

Gas supply 304 in these examples may supply an inert gas to robotic unit 308 through gas line 318. Gas line 318 may carry an inert gas to welding head 316. Gas supply 304 may take various forms. For example, gas supply 304 may supply an inert gas in the form of nitrogen, helium, argon, or some other suitable inert gas.

Of course, the particular gas selected may depend on the material being welded. For example, with titanium, nitrogen may cause contamination. As a result, if titanium is being welded, nitrogen is not used. Of course, a combination of gases may be supplied through gas supply 304 depending on the particular implementation.

Cooling unit 306 provides coolant to robotic unit 308 through coolant line 320. In these examples, the different advantageous embodiments include cover 322, which may be attached to welding head 316.

Vision system 312 provides information about the area in which welding is being performed by robotic unit 308. This information is used by computer 310 to control welding operations within welding environment 300. For example, vision system 312 may be used to guide robotic unit 308 in performing the welding operations.

In these illustrative examples, computer 310 may control laser 302, gas supply 304, cooling unit 306, robotic unit 308, and vision system 312. Robotic unit 308 may be controlled to direct laser energy from laser 302 onto welding location 324 of structure 326. Welding location 324 is a location at which a laser beam is applied or directed onto structure 326. Structure 326 may be one or more objects in these examples. In particular, structure 326 is a metal structure in the depicted examples.

As welding operations are performed, welding location 324 changes and prior welding locations on structure 326 are heated metal locations 328. Heated metal locations 328 are any locations in which welding has occurred and/or other locations in which heating of the metal in structure 326 has occurred such that contamination may occur with contact to air.

Contamination of welding location 324 and/or heated metal locations 328 upon contact with air may occur until heated metal locations 328 cool sufficiently. In the different advantageous embodiments, cover 322 has a shape capable of maintaining inert gas 330 around welding location 324 and heated metal locations 328. Cover 322 is capable of maintaining an environment of inert gas around welding location 324 and heated metal locations 328 in a manner that reduces and/or prevents contamination of these locations.

Additionally, cover 322 has a shape that channels or causes inert gas 330 to move away from welding location 324 and heated metal locations 328. This type of movement moves soot 332 or other contaminants generated during welding away from these areas. Further, cooling unit 306 may provide cooling for cover 322 in addition to welding head 316.

The illustration of welding environment 300 in FIG. 3 is not meant to imply physical or architectural limitations to the manner in which different welding environments may be implemented. Other welding environments may include other components in addition to or in place of the ones illustrated. In still other welding environments, some of the components illustrated in welding environment 300 may be unnecessary. For example, in some welding environments, a laser, in addition to laser 302, may be present.

In yet other advantageous embodiments, welding environment 300 may be a laser-hybrid welding environment in which another type of welding process is used in addition to laser welding. For example, in addition to laser 302, an arc welding unit also may be used in conjunction with laser 302 to perform welding on structure 326. In still other advantageous embodiments, vision system 312 may be unnecessary. In yet other advantageous embodiments, instead of using robotic unit 308, the movement of welding head 316 and cover 322 may be performed manually by a human operator.

Figure 4:
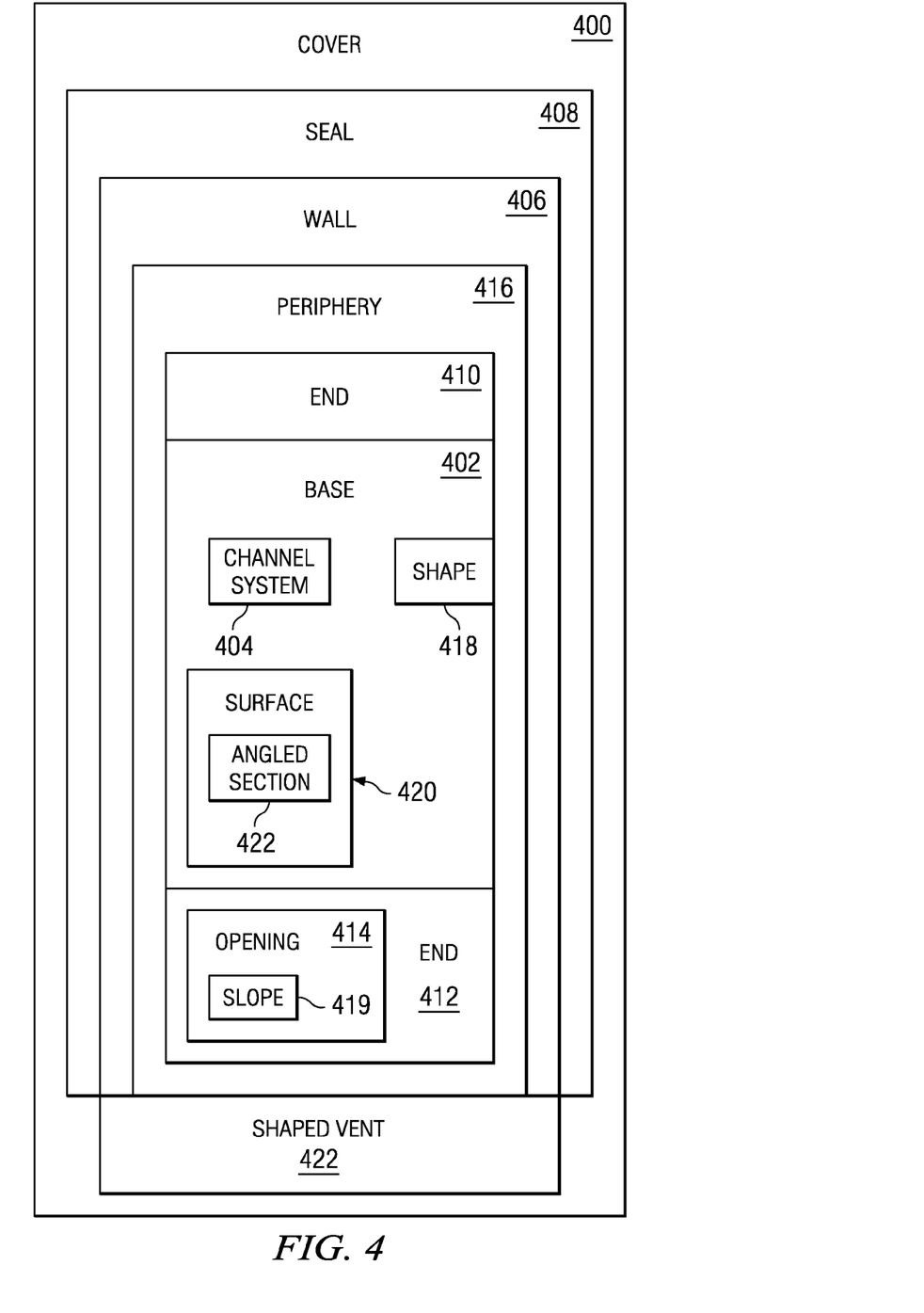
FIG. 4 is a diagram of a cover in accordance with an advantageous embodiment.

With reference now to FIG. 4, a diagram of a cover is depicted in accordance with an advantageous embodiment. In this example, cover 400 is an example of cover 322 in FIG. 3. In this illustrative example, cover 400 includes base 402, channel system 404, wall 406, and seal 408. Base 402 has end 410 and end 412. End 410 may be a first end and end 412 may be a second end of base 402.

In these examples, channel system 404 is a number of channels. A number as used herein refers to one or more items. For example, a number of channels is one or more channels.

In this example, channel system 404 is capable of receiving a laser beam and an inert gas. Depending on the particular implementation, the laser beam and inert gas may be received through a single channel. In other advantageous embodiments, the laser beam may be received through one channel in channel system 404, and the inert gas may be introduced using another channel within channel system 404.

Wall 406 extends from periphery 416 of base 402 and has opening 414. Base 402 and wall 406 have shape 418. Opening 414 is present around end 412 in wall 406. Wall 406 partially encloses channel system 404. Channel system 404 is closer to end 410 than to end 412 in these examples.

Base 402 also may contribute to shape 418. In these examples, surface 420 of base 402 has angled section 422. In these examples, surface 420 is closer to an opposite surface on base 402 at around end 412 as compared to end 410.

Shape 418 is capable of maintaining an inert gas introduced through channel system 404 in a welding location and/or heated metal locations such that contamination of these locations is reduced and/or eliminated. Further, shape 418 is such that an inert gas introduced through channel system 404 is capable of being channeled or moved from channel system 404 through opening 414 at around end 412. When base 402 and wall 406 are placed over a structure, a volume or other three-dimensional region is defined containing shape 418.

Shape 418, in this example, is an elongate shape that has a larger area around channel system 404 than opening 414. Wall 406 is a contoured wall such that shape 418 reduces in size from end 410 to end 412. In these different illustrative embodiments, shape 418 may be a tear drop shape. Of course, other shapes may be used as long as the shapes are capable of maintaining inert gas around a welding location and/or heated metal locations that may be contaminated in a manner that reduces and/or prevents contamination.

Further, shape 418 also may have a shape that allows for moving the inert gas through channel system 404 through opening 414 as the inert gas expands or is introduced. Movement of the inert gas from channel system 404 to opening 414 may aid in moving soot away from welding locations and/or heated metal locations to reduce and/or prevent contamination. Further, moving soot away from these locations also prevents or reduces a reduction in energy provided by a laser beam that can be caused by soot.

Opening 414 has slope 419 and is a nozzle and/or vent that allows for channeling the venting of gas away from a welding location and/or heated metal locations.

Seal 408 is attached to wall 406. In some advantageous embodiments, seal 408 may be part of wall 406 or may be comprised of wall 406. Seal 408 provides a capability to maintain an inert gas within the area of base 402 partially enclosed by wall 406. Seal 408 does not need to maintain an airtight seal in which an inert gas cannot escape through portions of seal 408.

Seal 408 provides enough of a barrier to prevent turbulence from introducing air into the area enclosed by wall 406. Seal 408 is capable of maintaining this type of environment when moving over contoured surfaces in these examples. Seal 408 may pivot about wall 406 in some examples.

Additionally, shaped vent 422 may be placed over opening 414 to change the shape and/or size of opening 414. Shaped vent 422 may be used to reduce the size of opening 414 in these examples. A reduction in the size of opening 414 may be appropriate depending on the rate of welding and/or type of material being welded. The change in the shape of opening 414 may be performed to insure that inert gas is maintained around the welding location and/or heated metal locations in which contamination may occur.

Seal 408 may take various forms. For example, seal 408 may be comprised of a material such as steel, a ceramic fabric, aluminum, copper, or some other suitable material. In these examples, base 402 and wall 406 may be comprised of a metal or other material that is capable of being used in laser welding without introducing contaminants. For example, base 402 and wall 406 may be made from a material such as, for example, aluminum, steel, titanium, or some other suitable material.

The illustration of cover 400 in FIG. 4 is not meant to imply physical or architectural limitations to the manner in which different covers may be implemented in different advantageous embodiments. For example, in some advantageous embodiments, wall 406 and base 402 may be made from a single piece. In other advantageous embodiments, wall 406 may be a separate part attached to base 402.

In yet other advantageous embodiments, wall 406 also may function as a seal itself in place of seal 408. In these examples, shape 418 may vary depending on the particular implementation. Other shapes may be used as long as these shapes provide for a capability to maintain inert gases in a location around welding locations and molten materials that may still be contaminated to prevent or minimize contact with air in a manner that reduces and/or prevents contamination.

Further, shape 418 may vary in a manner that allows for movement of inert gas from the channel towards opening 414 to move soot away from a welding location and heated metal locations.

Figure 5:
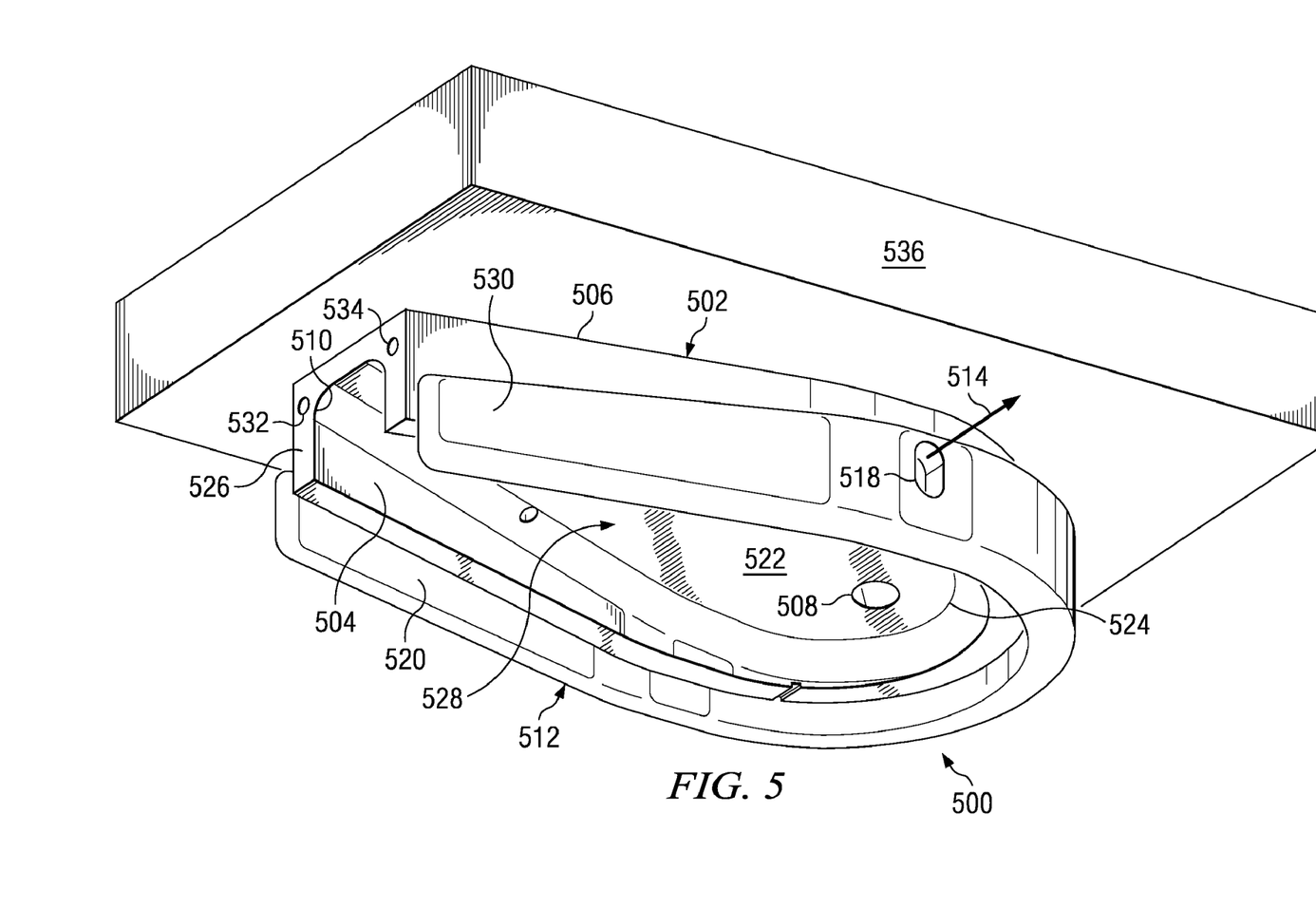
FIG. 5 is a diagram of a cover in accordance with an advantageous embodiment.

With reference now to FIG. 5, a diagram of a cover is depicted in accordance with an advantageous embodiment. Cover 500 is an example of one implementation for cover 400 in FIG. 4. In this illustrative example, cover 500 has base 502 with wall 504 extending from periphery 506 of base 502. Base 502 has channel 508, which provides an opening for a gas and a laser beam to enter. In this example, seal 512 is movably attached to wall 504.

Seal 512 may pivot about arrow 514 in these examples. Movement of seal 512 may be provided through screws or other fasteners used to attach seal 512 to wall 504. As can be seen in this view, a screw may be placed into hole 518 of seal 512 to attach seal 512 to wall 504. Another screw and opening may be located on side 520 but not seen in this view. In this particular example, wall 504 is a contour of a wall and partially encloses channel 508 with opening 510.

As can be seen in this illustrative example, base 502 and wall 504 of cover 500 partially enclose area 522. Area 522 has a shape that tapers and/or lessens in size from end 524 to end 526. End 524 may be a first end, while end 526 may be a second end. In this example, area 522 is an elongate shape that is around the shape of a tear drop. Gas may be introduced through channel 508 when cover 500 is placed over a structure for laser welding.

The introduction of the gas through channel 508 may form an environment in which inert gas is present and prevents air from touching areas in which laser welding is occurring and heated metal areas that still need to be cooled without contact to air to minimize and/or avoid contamination.

The shape of area 522 with wall 504 forms partially enclosed volume 528 when seal 512 is placed onto a structure. The shape of partially enclosed volume 528 is such that inert gas entering through channel 508 may move towards end 526 and exit through opening 510 in a manner such that any soot generated during laser welding may be moved with the inert gas through opening 510. Thus, the movement of the soot may prevent the soot from resulting in a reduction in the energy of a laser beam sent through channel 508 to perform laser welding.

The shape of area 522 is such that gas moves towards end 526. In these examples, a higher pressure of gas is present closer to end 524 where channel 508 is present as opposed to end 526 where opening 510 is present. In these examples, the length and width of cover 500 may vary depending on the particular implementation. The target speed of welding may influence both the length and width of cover 500.

For example, as the welding speed increases, a longer length and/or wider width may be needed. The width of cover 500 may insure that inert gas is present over any of the locations having a temperature that will cause contamination from air. For example, as the heat input increases, the width of the hot metal will increase requiring a wider width of coverage. Reducing the speed while maintaining a constant power will increase the heat input. As speed increases with constant power, the heat input decreases.

Further, the shape and size of cover 500 also may be influenced depending on whether the welding operation is being performed in a straight line or not in a straight line. If a straight line is used for welding, the width from side 520 to side 530 may be narrower. Curved weld paths may require the width of the cover to be increased for various curve radii.

In these illustrative examples, hole 532 and hole 534 on wall 504 provide a place to mount a plate or vent to change the size of opening 510. A smaller size for opening 510 may be desirable depending on the gas flow rate, type of gas, and/or speed at which laser welding occurs. These and other factors may affect the amount of soot that is generated during welding operations.

In these examples, seal 512 may be made from a material such as, for example, without limitation, aluminum, steel, or some other suitable metal. In other advantageous embodiments, a ceramic fabric may be used for seal 512 depending on the particular implementation. In these examples, cover 500 is attached to mounting plate 536. Mounting plate 536 may, in turn, be attached to another structure such as, for example, a welding head or assembly. Mounting plate 536 may be cooled depending on the particular implementation. By cooling mounting plate 536, heat may be channeled away from cover 500.

Figure 6:
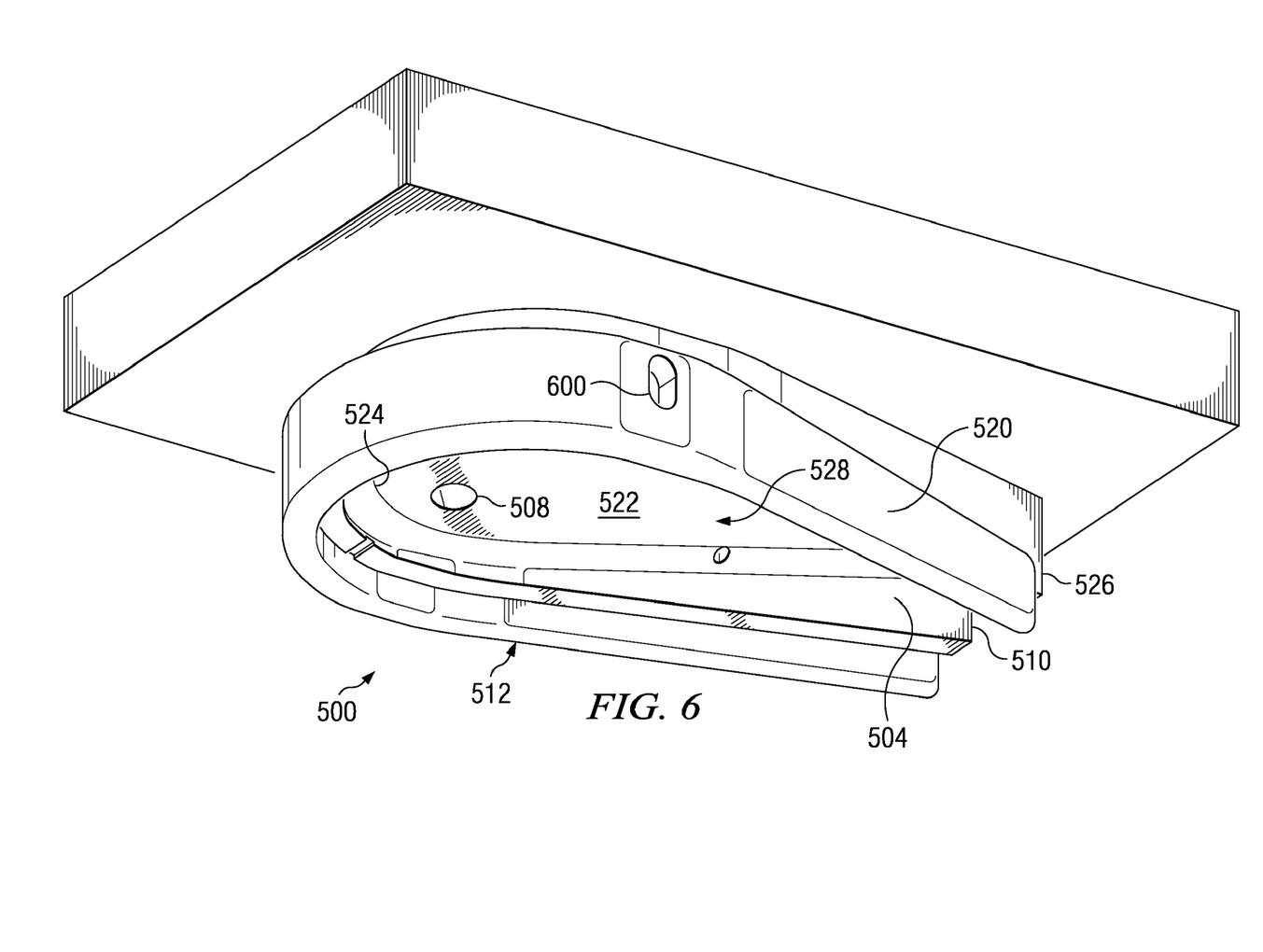
FIG. 6 is another view of a cover in accordance with an advantageous embodiment.

With reference now to FIG. 6, another view of a cover is depicted in accordance with an advantageous embodiment. In this example, cover 500 may be seen from another perspective view. In this particular view, hole 600 may be seen in seal 512 on side 520 of cover 500. A screw may be placed through hole 600 to movably mount seal 512 to wall 504.

Figure 7:
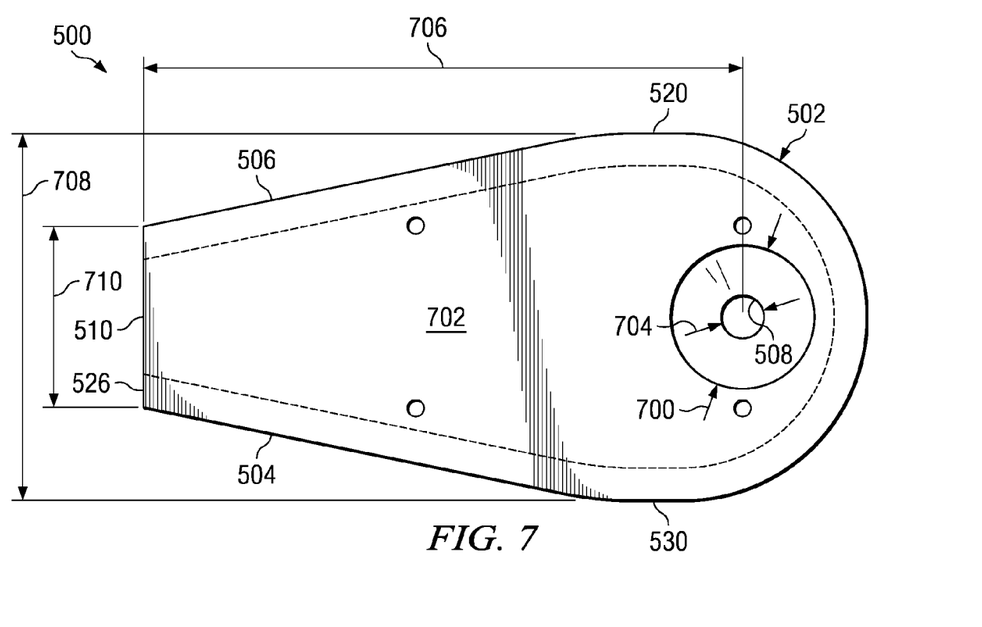
FIG. 7 is a top view of a cover in accordance with an advantageous embodiment.

With reference now to FIG. 7, a top view of a cover is depicted in accordance with an advantageous embodiment. In this example, a portion of cover 500 is illustrated. Base 502 and wall 504 without seal 512 is depicted in this example. In this example, a top view of cover 500 is illustrated. In this particular view, channel 508 may be seen having diameter 700 on surface 702 with diameter 704 on a surface opposite to surface 702. In other words, channel 508 has a cone shape.

In this illustrative example, base 502 has length 706, which may be around 4.4 inches. Base 502 may have width 708, which tapers down to width 710. In these illustrative examples, width 708 may be around 2.25 inches, while width 710 may be around 1.123 inches.

Figure 8:
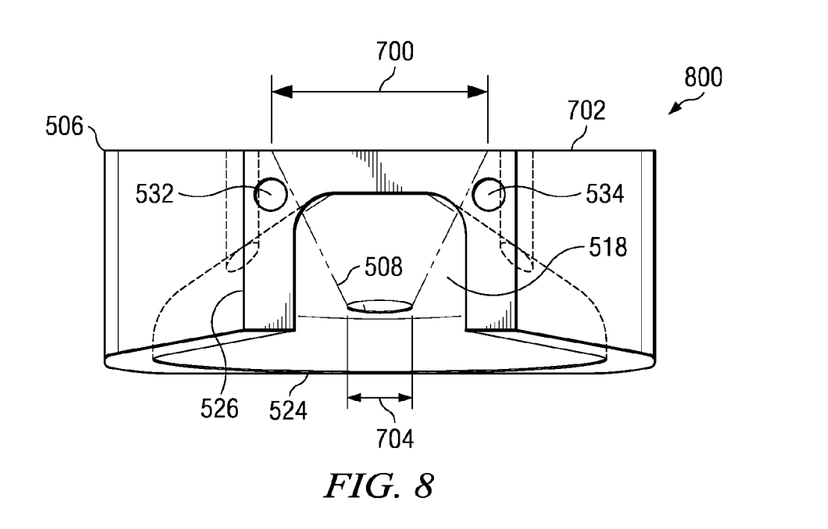
FIG. 8 is a diagram of a portion of a cover in accordance with an advantageous embodiment.

With reference now to FIG. 8, a diagram of a portion of cover 500 is depicted. In this example, a rear view of base 502 and wall 504 is illustrated. Further, channel 508 is shown in phantom to better illustrate the cone shape of channel 508 in this particular view.

Figure 9:
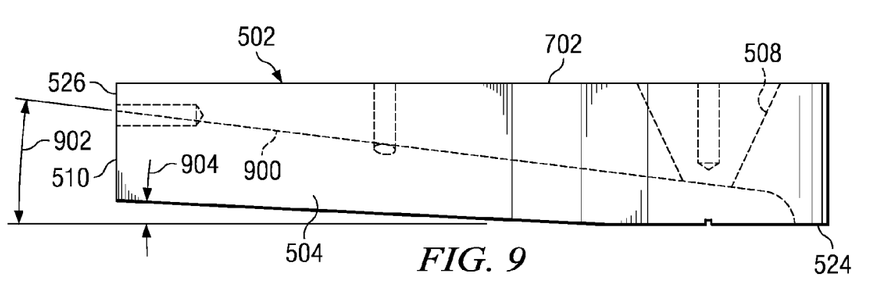
FIG. 9 is a side view of a portion of a cover in accordance with an advantageous embodiment.

With reference now to FIG. 9, a side view of a portion of a cover is depicted in accordance with an advantageous embodiment. In this illustrative example, a side view of base 502 with wall 504 is depicted in accordance with an advantageous embodiment. As can be seen in this side view, base 502 has angled surface 900, which becomes closer to top 702 as angled surface 900 extends from end 524 to end 526. In this example, angled surface 900 may have angle 902. Additionally, wall 506 also may be angled at angle 904.

Figure 10:
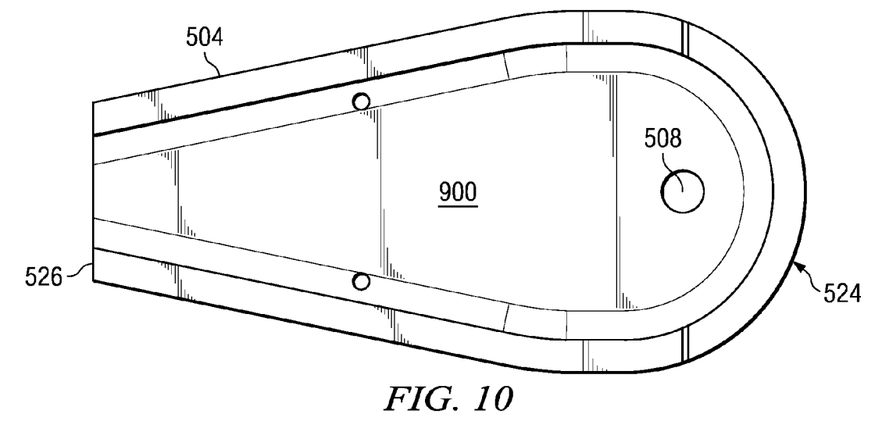
FIG. 10 is a bottom view of a portion of a cover in accordance with an advantageous embodiment.

With reference now to FIG. 10, a bottom view of a portion of a cover is depicted in accordance with an advantageous embodiment. In this example, a bottom view of base 502 with wall 504 is illustrated. Angled surface 900 is on the opposite side of base 502 from surface 702.

Figure 11:
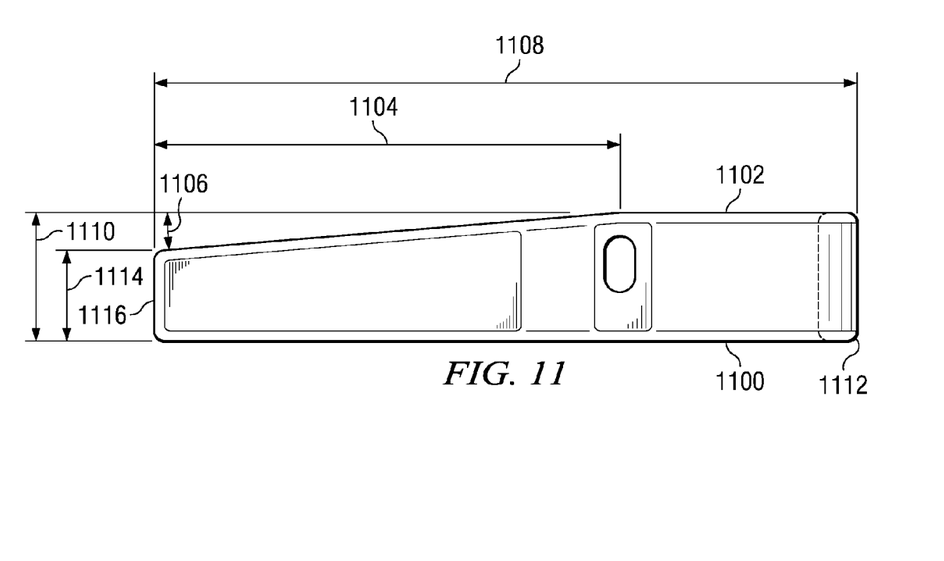
FIG. 11 is a side view of a seal in accordance with an advantageous embodiment.

With reference now to FIG. 11, a diagram illustrating a seal is depicted in accordance with an advantageous embodiment. In this example, a side view of seal 512 is depicted. In this example, edge 1100 is substantially planar, while edge 1102 has angled section 1104 that has angle 1106. In this advantageous embodiment, seal 512 may have length 1108. Length 1108 may be around 4.68 inches in this example. Seal 512 may have height 1110 at end 1112 which tapers down to height 1114 at end 1116. This tapering occurs in these examples through angled section 1104.

Figure 12:
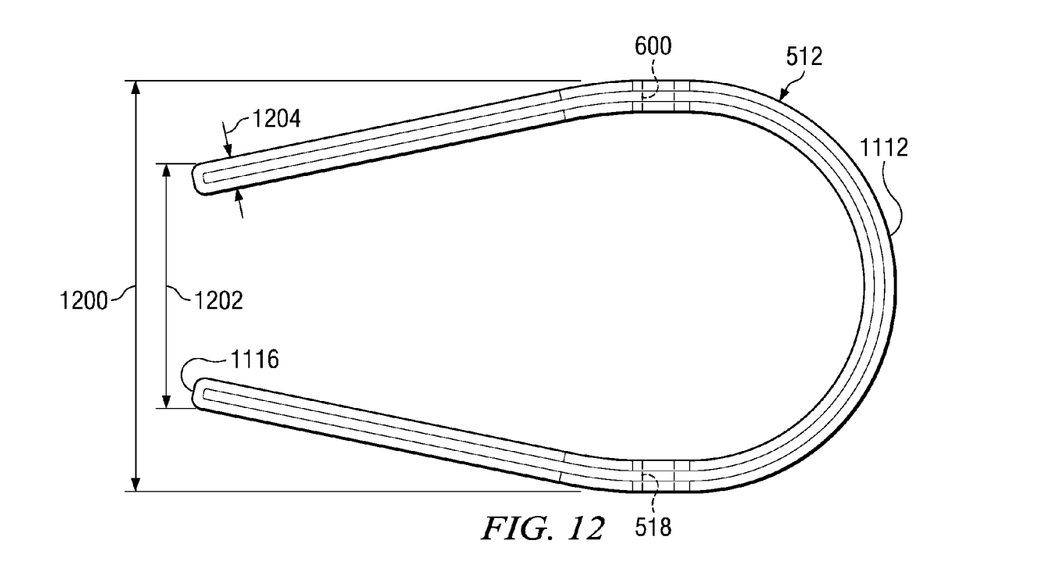
FIG. 12 is a top view of a seal in accordance with an advantageous embodiment.

With reference now to FIG. 12, a top view of a seal is depicted in accordance with an advantageous embodiment. In this illustration of seal 512, seal 512 may have width 1200, which may taper to width 1202. Width 1200 may be around 2.71 inches, while width 1202 may be around 1.4 inches. In these examples, seal 512 may have thickness 1204 which may be around 0.2 inches.

Figure 13:
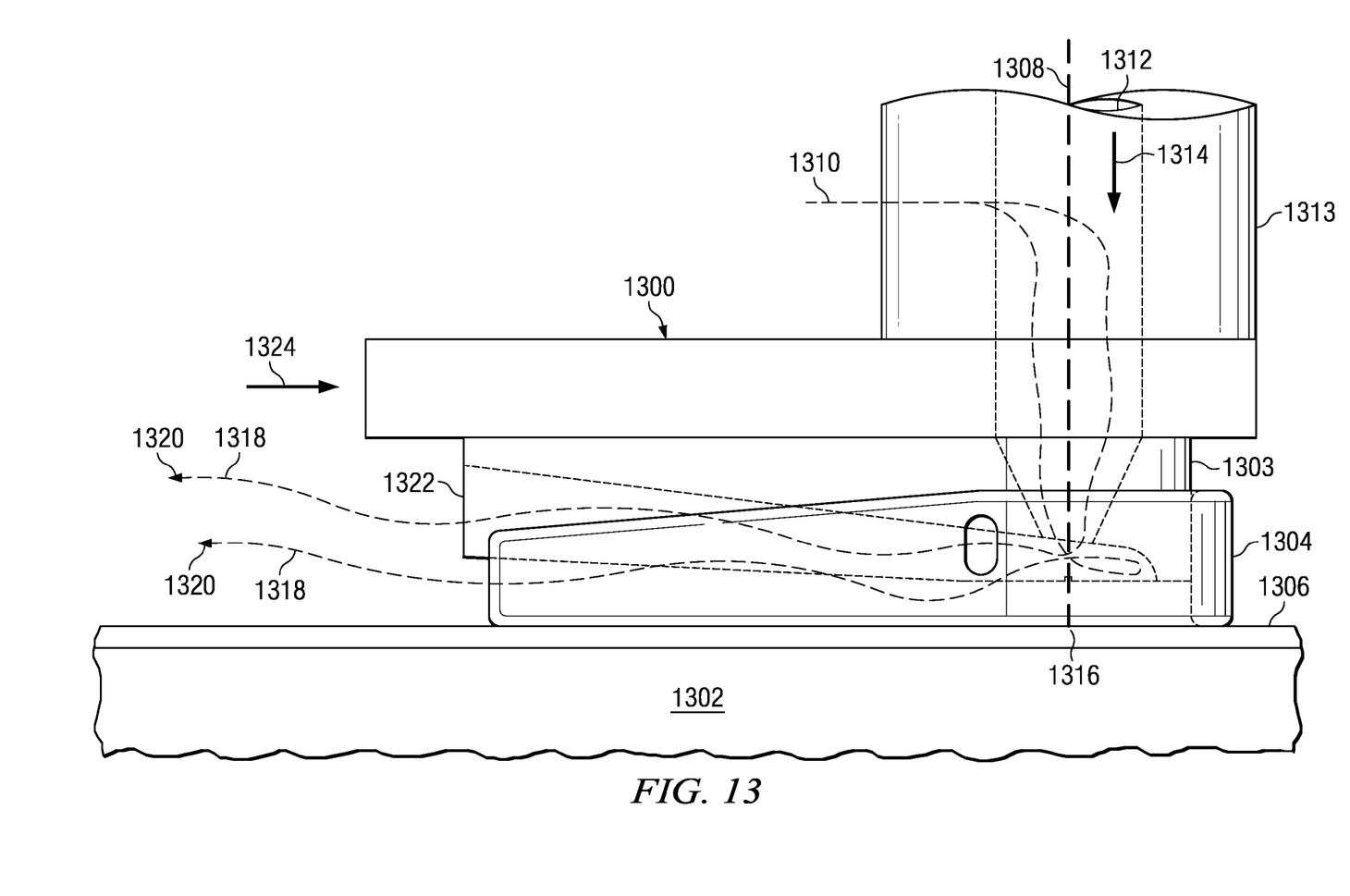
FIG. 13 is a diagram of a cover on a structure in accordance with an advantageous embodiment.

With reference now to FIG. 13, a diagram of a cover on a structure is depicted in accordance with an advantageous embodiment. In this example, cover 1300 is an example of cover 500 in FIG. 5 on structure 1302. In this example, structure 1302 may be titanium parts being welded to each other through a laser welding process. Also in this example, cover 1300 may include base 1303 and seal 1304.

In this illustrative example, seal 1304 contacts surface 1306 of structure 1302. Laser beam 1308 and gas 1310 are introduced through channel 1312 through laser welding head 1313 and into the interior of cover 1300 in the direction of arrow 1314. Welding may occur around location 1316 on surface 1306 of structure 1302. During welding of structure 1302, the gas introduced through channel 1312 forms an environment within cover 1300 in which air may be prevented from contacting location 1316 and causing contamination. Further, gas 1310 may travel in as gas and soot exhaust 1318 along the direction of arrows 1320 to exit cover 1300 at opening 1322. In this welding process, cover 1300 may move in the direction of arrow 1324.

The movement of gas and soot exhaust 1318 along the direction of arrows 1320 may move the soot in gas and soot exhaust 1318 away from location 1316 and out of cover 1300 through opening 1322. This movement of soot away from location 1316 may not only prevent air from contaminating location 1316 but also may minimize and/or prevent reduction in the laser power applied to location 1316 that may be due to the soot in gas and soot exhaust 1318.

Figure 14:
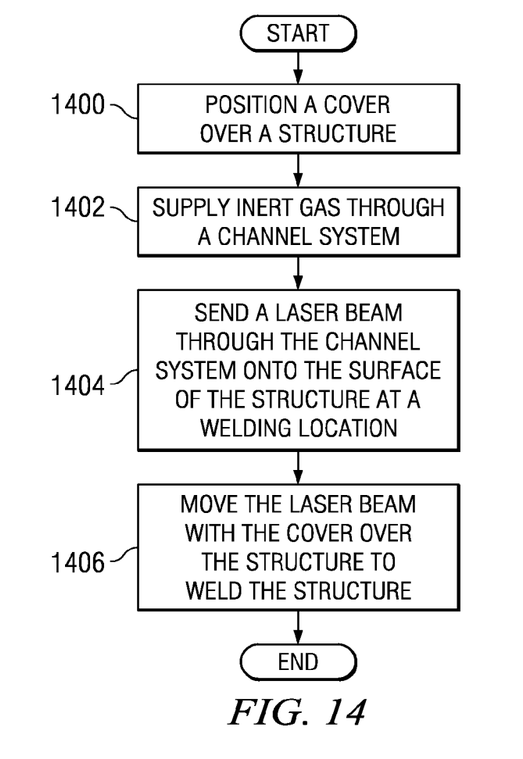
FIG. 14 is a flowchart of a process for performing a laser welding operation in accordance with an advantageous embodiment.

With reference now to FIG. 14, a flowchart of a process for performing a laser welding operation is depicted in accordance with an advantageous embodiment. The process illustrated in FIG. 14 may be implemented using a welding environment such as, for example, welding environment 300 in FIG. 3.

The process begins by positioning a cover over a structure (operation 1400). In this example, the cover has a base with a first end, a second end, and a channel system in which the channel system is located closer to the first end than the second end of the base. A wall extends from the side of the base to partially enclose the channel system. An opening in the wall is located closer to the second end than the first end. The shape of the wall is capable of retaining an inert gas introduced through the channel systems in a welding location and capable of causing the inert gas to move away through the channel system through the opening in the wall.

The process supplies inert gas through the channel system (operation 1402). The process also sends a laser beam through the channel system onto the surface of the structure at a welding location (operation 1404). The process then moves the laser beam with the cover over the structure to weld the structure (operation 1406), with the process terminating thereafter.

In this example, operation 1402 continues to be performed while operations 1404 and 1406 are performed. In other advantageous embodiments, other operations such as, for example, halting application of the laser beam through the channel system and moving the cover to another structure may be performed. In these examples, the structure may be, for example, without limitation, two aircraft parts being welded together.

The flowchart and block diagrams in the different depicted embodiments illustrate the architecture, functionality, and operation of some possible implementations of apparatus, methods, and computer program products. In this regard, each block in the flowchart or block diagrams may represent a module, segment, or portion of computer usable or readable program code, which comprises one or more executable instructions for implementing the specified function or functions.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the different advantageous embodiments provide a method and apparatus for welding structures. In the different advantageous embodiments, a cover having a base with a first end, a second end, and a channel system is present. A wall extends from the base to partially enclose the channel system. An opening is present in the wall that is closer to a second end than the first end of the base.

The shape of the wall is capable of retaining a gas introduced through the channel system in a welding location and causing the gas to move away from the channel system and through the opening in the wall. One or more of the different advantageous embodiments provide a capability to seal a welding location and hot metal from contamination until the hot metal is capable of cooling sufficiently to minimize or prevent contamination.

Further, the different advantageous embodiments also provide a capability to channel gas from a channel system through an opening. This channeling of the gas may occur in a manner that helps move soot away from the laser beam to prevent soot from blocking the laser beam during welding operations. Also, a seal that is movable may provide a capability to move over contoured surfaces while still providing adequate gas pressure to prevent contamination from air.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising: a base having a first end, a second end, and a channel system, wherein the channel system is located closed to the first end than the second end of the base; a wall extending from a side of the base to partially enclose the channel system; and an opening in the wall that is located closer to the second end than the first end, wherein a shape of the wall is capable of retaining a gas introduced through the channel system in a welding location and causing the gas to move away from the channel system and through the opening in the wall; and a seal separate from the wall, pivotally attached to the wall, and conforming to a surface of a structure; wherein the channel system comprised a number of holes in the base, wherein the number of holes is capable of receiving a laser beam and an inert gas.

2. The apparatus of claim 1 wherein the wall is substantially rigid.

3. The apparatus of claim 2 further comprising:
a pair of screws that moveably attach the seal to the surface of the wall.

4. The apparatus of claim 1, wherein the shape of the wall reduces in size from the first end to the second end.

5. The apparatus of claim 1, wherein the shape of the wall is a tear drop shape.

6. The apparatus of claim 1, wherein the side of the base is a first side, the base has a second side opposite the first side, and the first side of the base has a slope that slopes toward the second side and the opening.

7. The apparatus of claim 1, wherein the side is a first side, the base has a second side opposite the first side, and the channel system comprises a channel having a first diameter at the first side and a second diameter at the second side.

8. The apparatus of claim 1 further comprising:
a shaped vent attached to the opening.

9. The apparatus of claim 2, wherein the seal is comprised of a material selected from steel, a ceramic fabric, aluminum, and copper.

10. The apparatus of claim 1, wherein the base and the wall extending from the base are comprised of a material selected from one of steel, aluminum, and copper.

11. The apparatus of claim 1 further comprising:
a welding head, wherein the base is capable of being secured to the welding head.

12. The apparatus of claim 11 further comprising:
a laser coupled to the welding head; and
a gas supply connected to the welding head.

13. The apparatus of claim 12 further comprising:
a cooling unit connected to the welding head and capable of cooling the base and the wall.

14. The apparatus of claim 13 further comprising:
a robotic unit, wherein the welding head is attached to the robotic unit and wherein the robotic unit is capable of moving the welding head during a laser welding operation; and
a computer connected to the robotic unit, wherein the computer is capable of controlling the robotic unit to move the welding head to perform the laser welding operation.

15. A cover for laser welding, the cover comprising:
a base having a first side, a second side, and a channel extending from the first side to the second side, wherein the channel is capable of receiving a laser beam and an inert gas;
a wall extending from the first side of the base, wherein the wall encloses an area having an elongate shape that has a largest area around the channel, wherein the elongate shape tapers away from the channel, wherein the wall partially surrounds the channel, and wherein the wall has a tapered end;
an opening in the wall located around the tapered end of the wall, wherein the elongate shape is capable of causing the inert gas to move from the channel to the opening; and
a seal separate from the wall and pivotally attached to the wall, wherein the seal conforms to a surface of a structure.

16. The cover of claim 15, wherein the seal is comprised of a material selected from one of aluminum, steel, and a ceramic fabric.

17. A method for laser welding, the method comprising:
positioning, using a robotic unit, a cover over a structure, wherein the cover has a base with a first end, a second end, and a channel, in which the channel is located closer to the first end than the second end of the base; a wall extending from a side of the base to partially enclose the channel; an opening in the wall that is located closer to the second end than the first end; and a seal separate from the wall, pivotally attached to the wall, and conforming to a surface of the structure;

supplying an inert gas through the channel, wherein a shape of the wall retains a portion of the inert gas introduced through the channel in a welding location and causes a flow of the inert gas to move away from the channel and through the opening in the wall;

sending a laser beam through the channel onto a surface of the structure at the welding location; and moving the laser beam with the cover over the structure to weld the structure.

* * * * *